United States Patent [19]

Blanc et al.

[11] Patent Number: 4,629,878

[45] Date of Patent: Dec. 16, 1986

[54] OPTICAL APPARATUS FOR CONTROLLING A TOOL

[75] Inventors: Jean-Pierre Blanc, Morges; Francis Carrard, Lonay; Claude Devenoges, Morges, all of Switzerland

[73] Assignee: Ateliers de Constructions Mecaniques de Vevey S.A., Switzerland

[21] Appl. No.: 577,895

[22] Filed: Feb. 7, 1984

[30] Foreign Application Priority Data

Feb. 11, 1983 [CH] Switzerland .......................... 774/83

[51] Int. Cl.⁴ ................................................ G05B 1/00

[52] U.S. Cl. ..................................... 250/202; 318/577

[58] Field of Search ............................... 250/202, 560; 219/121 EB; 318/577; 356/384, 387

[56] References Cited

U.S. PATENT DOCUMENTS

| | | | |
|---|---|---|---|
| 3,766,355 | 10/1973 | Kottkamp | 219/121 EB |
| 4,114,034 | 9/1978 | Hunka | 250/202 |
| 4,328,416 | 5/1982 | Dudley et al. | 318/577 |

*Primary Examiner*—David C. Nelms
*Assistant Examiner*—James G. Gatto
*Attorney, Agent, or Firm*—Anthony A. O'Brien

[57] ABSTRACT

A sensing and regulating apparatus for use with a tool such as a welding torch guided along a bevel, an oxygen cutting head, a chisel, a milling cutter, or a nibbling machine, comprises an optical apparatus projecting a light ray on a reference line where it delineates a spot which is diffused particularly toward a receiver consisting of elements sensitive to light. The spot of light falling on the receiver supplies two adjustment signals according to its position and its width. These signals are used to control elements carrying the optical apparatus so that the apparatus continually follows the reference line and so that it always remains at the same distance from the reference line. The movements of the optical apparatus control the associated working tool so that its path is equal, or homothetic, to that of the optical apparatus as a result of the reference line.

10 Claims, 4 Drawing Figures

4
1
10
14
13
10
13
9
12
5
5
13
9
8
5
6
7
β
11
∝
24
2
21
20

14
10
13
9
4
18
13
5
17
10
9
8
5
15
1
16
8
5
6
7
11
22
2

14
19
9
10
13
13
10
9
4
5
1
8
15
16
A
7
6
23
11
∝
3
2
12

14
9
4
10
13
9
1
10
5
15
16
8
7
6
23
11
∝
3
A'
2
12

OPTICAL APPARATUS FOR CONTROLLING A TOOL

BACKGROUND OF THE INVENTION

Equipment for machining, cutting, and welding in which the tool, for example a welding torch, an oxygen cutting head, for thermal cutting, a chisel, a milling cutter, a nibbling machine automatically follows the path of a welding bevel, no matter what its path, are known. The processes used to detect the position of the bevel and to produce a position control signal, acting directly or by means of an amplification relay, are diverse. Actually, mechanical, magnetic, optical, pneumatic and still other tracers are already used. But these apparatus are delicate, their adjustment is difficult. Their operation is often random and maintenance expensive, mainly because of the very harsh conditions of use: high temperatures, light, fumes, noise, etc. prevailing in the vicinity of the electric welding arc, i.e., precisely in a place where the apparatus must operate.

The object of this invention consists in an improvement to this type of apparatus and relates more particularly to an optical apparatus for detecting the position of a reference line formed by a stop located on the edge of a sheet, respectively of a metal or other, sheet of a copying template, of the edge of a line of sufficient width drawn on a support, the optical apparatus carried by an arm and comprising a light emitter whose wavelength can be selected in the area corresponding to visible light or in that of the infrared, this emitter producing a light ray which travels a first incident axis, falls in the shape cut in various directions, particularly in that of a second axis of diffused light connecting this point to a receiver whose surface consists of a large number of cells, each being sensitive to the radiation received and producing an electric signal as a function of its brightness, the group of signals received by the receiver supplying data entering into an electric apparatus acting on the elements carrying the optical apparatus so that the spot of light falling on the reference line whose path can be rectilinear or curvilinear, follows the reference line during the advancing of the operation in progress, by keeping the arrangement of the reference line and of the optical apparatus equal to an instruction value which can be suited to the nature of the operation in progress, the movements of the optical apparatus controlling the concomitant movements of a tool so that this tool follows a path homologous to the reference line, characterized in that the position in relation to the receiver of the bright spot diffused on the receiver by the spot falling on the reference line, constitutes on adjustment signal used to keep at its value the instruction for the distance between the optical apparatus and the reference line, and in that the width of the bright spot falling on the receiver constitutes an adjustment signal used for the control of the transverse movements of the optical apparatus in relation to the reference line.

BRIEF DESCRIPTION OF THE DRAWINGS

The four accompanying figures diagrammatically represent the operation of the apparatus.

FIG. 4 further show the folded down drawing of the receiver and the shape and the position of the bright spot falling on it.

DESCRIPTION OF THE PREFERRED EMBODIMENTS

Figure 3:
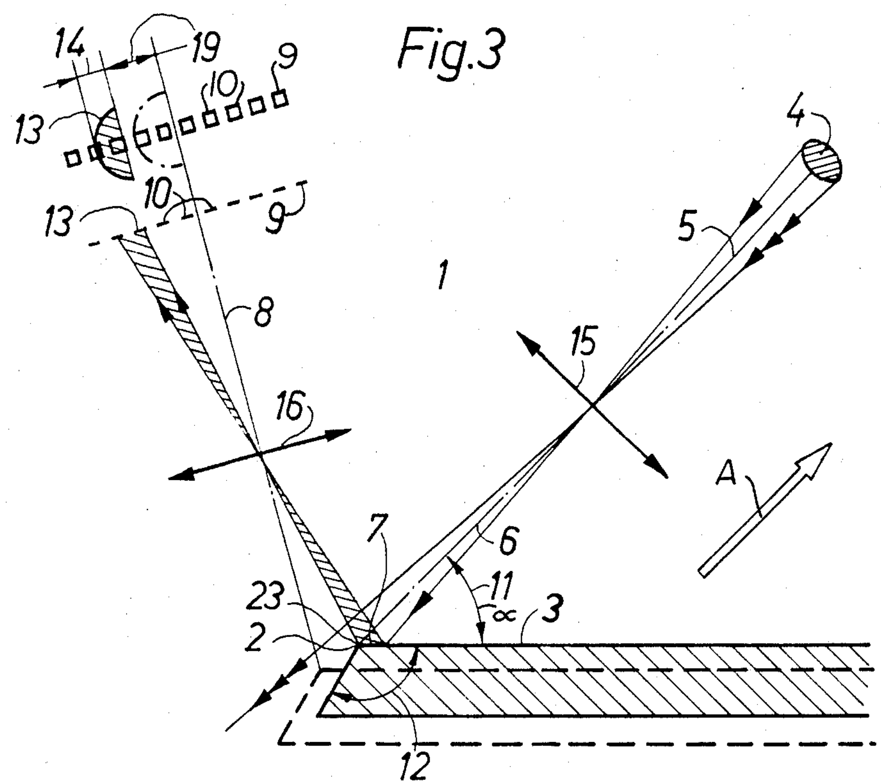
FIG. 3 shows the effect of a variation of the distance of the optical apparatus in relation to the sheet in the case of the control of a welding torch.
Figure 4:
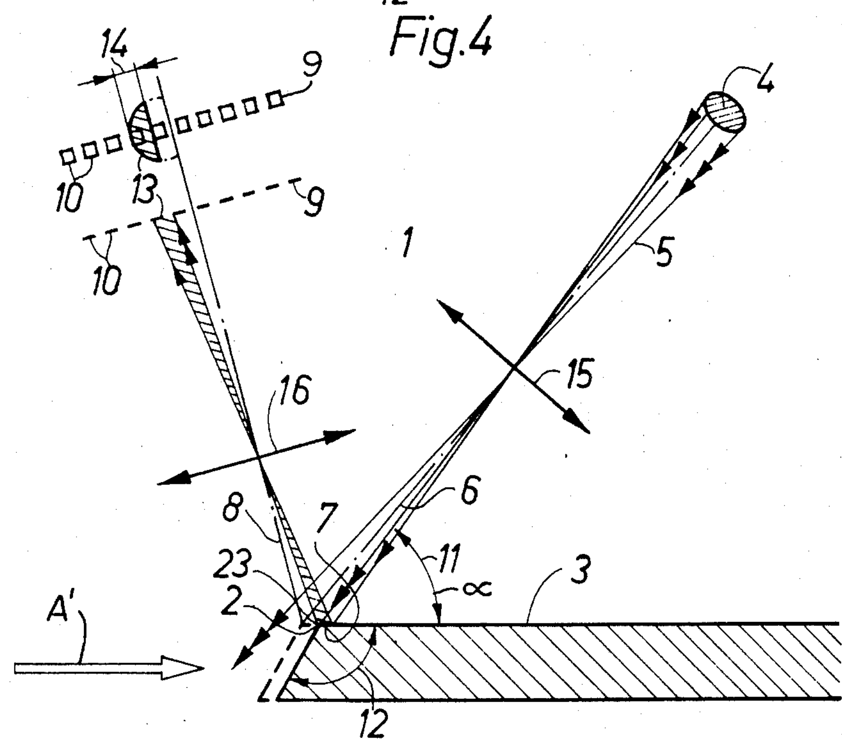
FIG. 4 shows the effect of a variation of the distance between the spot and the welding bevel and parallel to the sheet in the case of the control of a welding torch.

The apparatus of the above figures comprise the following main parts:

1. optical apparatus
2. reference line
3. sheet
4. light emitter
5. light ray
6. axis of incident light
7. spot
8. axis of diffused light
9. receiver
10. sensitive cells
11. angle $\alpha$, which is the smaller of the two angles of the incident and diffused axes in relation to the sheet, or to the support or to the template
12. angle $\beta$, which is the smallest angle between the surface of the sheet and that of the welding bevel
13. bright spot falling on the receiver
14. width of the bright spot
15. convergent lens of the incident ray
16. convergent lens of the diffused ray
17. flat mirror
18. axis of rotation of the receiver
19. movement of the position of the bright spot on the receiver
20. edge of a line
21. support
22. copying template
23. stop located on the edge of a sheet
24. line In the case of FIGS. 3 and 4, only one of the two sheets to be welded was shown, of course the bevel is fixed on a second object which must be welded to the first.

Figure 1:
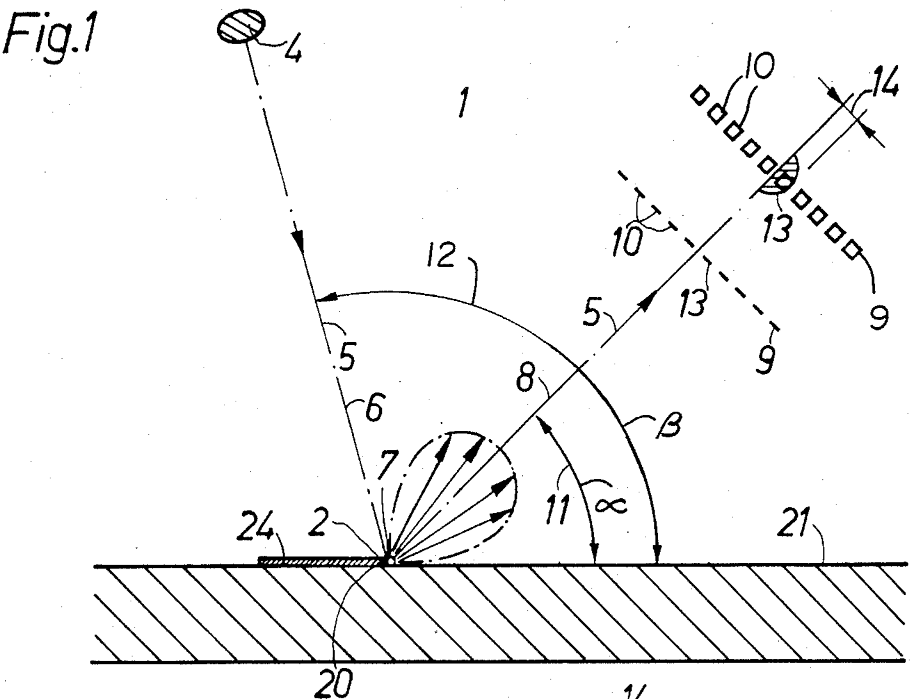
FIG. 1 is a basic diagram of a simplified apparatus where the optical apparatus follows the edge of a line drawn on a support.

FIG. 1 is a simplified functional diagram; the light emitter apparatus (4) emits a light directed in several directions and particularly along an axis (6) of the incident light falling on the edge (20) constituting the reference line (2) of a line (24) drawn on a support (21). This light falls on the surface of this support and produces a bright spot (7) at this place. This support, in turn, reflects the light received and diffuses it in all directions according to a variable intensity, a function of the angle. Particularly, it sends this light along the axis (8) of diffused light which falls on a receiver (9). The surface of this receiver consists of a network of cells (10) sensitive to the radiation received, each of which produces an electric signal as a function of its brightness. The operating principle of the apparatus is as follows: when the optical apparatus is arranged according to the drawing, the bright spot (7) which falls on the support (21) draws on the support, because of the presence of the line (24) which absorbs the light, a spot in the shape of a half-moon, since its axis (6) conincides with the edge (20). This half-moon image is, in turn, diffused at 13 on the receiver while keeping the same shape. The diameter of the spot corresponding to the reference line (2) which cuts this bright spot (7) in two, is specifically on the axis (8) of the diffused light. If the axis of the spot of the incident light does not coincide with the edge (20), the shape of the bright spot on the surface of the support (21) would not be a half-moon, it would be either smaller or larger as FIG. 4 shows.

The width of the bright spot is a function of the positioning of the optical apparatus (1) in relation to the reference line (2), a positioning measured parallel to the surface (21). Therefore, it is enough to measure the width of the bright spot on the receiver to constitute an adjustment signal as a function of the position of the optical apparatus parallel to the surface of the support (21). In the case where the distance measured perpendicular to the surface of the sheet does not correspond to the instruction value, the bright spot (7) is moved in relation to the receiver in one direction or the other, as FIG. 3 shows.

In all of the diagramatic drawing figures, the receiver 9 and its array of cells 10, are shown both in side elevation where the edges thereof will be seen, as well as in plan view to more clearly depict the locus and width of the received bright spot 13.

FIGS. 3 and 4 show the effect of relative movement between the optical apparatus and the bevel. The instruction position is shown by a broken line.

A translation in the direction of the axis of the incident light, along the axis of the arrow A in FIG. 3, keeps for the half-moon, falling on the receiver, the same shape, but moves the image along the reciever. A movement parallel to the surface of the support (21) or of the sheet (3), along the axis of the arrow A' in FIG. 4, modifies the shape of the spot falling on the receiver which changes in width (14).

The positioning (19) of the spot of the bright spot on the sensitive cell (10) constitutes an adjustment signal that makes it possible to adjust the distance between the optical apparatus and the sheet. The combination of these two effects, width and positioning of the bright spot on the receiver, supplies two different signals that make it possible to control the optical apparatus so that during a working operation, oxygen cutting, welding, machining or nibbling, the optical apparatus is always maintained according to the diagram of FIG. 1 where the axis of incident light (6) falls precisely on the reference line (2). This arrangement of the optical rays exhibits, in the case of welding operations, the great advantage of only concerning the stop (2) of one of the two welding sheets, a stop which always keeps the same shape during the welding of thick sheets requiring several passes of the welding torch, until the completion of the operation. If the sum of the angles $\alpha$ and $\beta$ (arcs 11, 12 respectively) is smaller than 180°, the light emitted by the emitter (4) and falling into the bevel, is reflected in all directions by this bevel and particularly against the other face of the bevel, but it cannot be sent back in the direction of the receiver and disturb the data that it is receiving.

Figure 2:
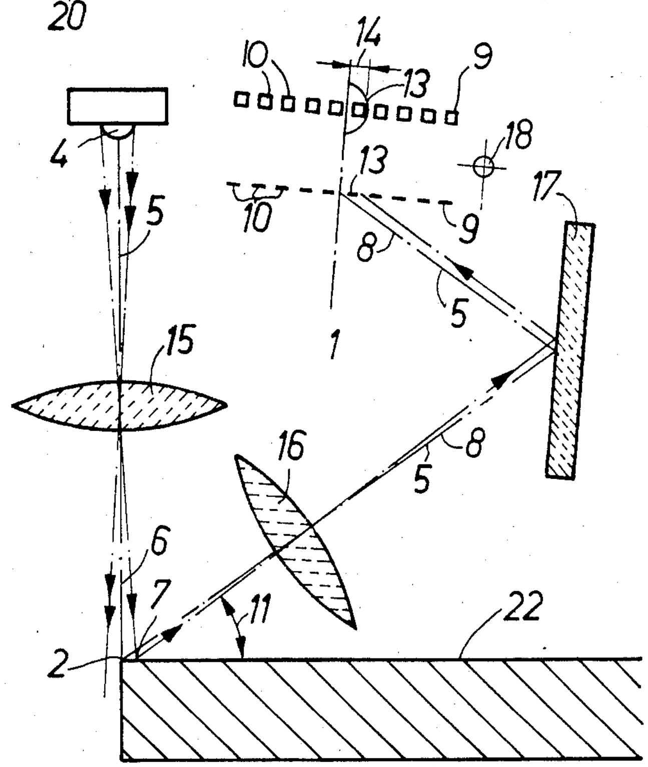
FIG. 2 is the diagram of an apparatus such that it can be made where the optical apparatus follows a copying template.

FIG. 2 shows a more constructive arrangement of the apparatus whose operation remains the same as that of FIG. 1. In this construction, the light emitter has been replaced by a light emitting diode whose wavelength corresponds to the infrared. This light passes through a first convergent lens (15) which concentrates all the rays that it receives on the reference line (2) of the copying template (22) which, as before, sends back the light (5) along the axis of the diffused light (8). This light passes through a second convergent lens (16), falls on a flat mirror (17) which sends it back on the receiver. The presence of lenses makes it possible to significantly increase the brightness of the bright spot (7), and consequently, of the bright spot (13) that falls on the receiver.

The flat mirror (17) has the effect of deviating the ray, and of making it possible to house the receiver (9) closer to the light emitter (4) so as to reduce the dimensions of the optical apparatus. It would also be possible to mount a flat mirror between the emitting diode and the convergent lens (157, which would make it possible to move this diode and to further reduce the dimensions of the apparatus.

The operation of the unit remains the same. The bright spot produced at (7) is sent back at (13) and makes it possible to produce the two adjustment signals necessary for the control of the positioning in relation to the reference line (2). In the case of a design of this nature where lenses are used, the receiver should be oriented so that the image that it receives is clear over its entire periphery. For this purpose, it is necessary to have the receiver rotate around an axis of rotation (18) which is perpendicular to the plane of the axes (6) and (8).

The receiver can consist of elongated photodiodes, in such a way that each one of them can receive in its length the diameter of the bright spot, and located alongside one another in a row whose axis is placed in the same plane as the axes of incident and diffused light.

The four drawings mention only the optical apparatus. Of course this apparatus is housed in a case and it is held above the welding bevel by an arm to which it is connected by mechanism that make it possible to move it so that is distance, in relation to the sheet, or to the template (22), to the support (21), can be kept equal to an instruction value, and automatically follows the path of the reference line (2) during the advance of the working operation in progress.

In the case of welding work, this optical apparatus could be fastened to the welding torch itself, and control the mechanical elements for positioning of this torch so that it follows the welding bevel as above.

To prevent the electric welding arc from disturbing the operation of the optical apparatus, the optical apparatus is located in front of the electrode, at a distance sufficient to be protected from the atmosphere that this electrode causes (temperature, fumes, brightness lighting, scattering of particles, etc.).

The control apparatus can comprise an electronic device that records and stores after recording the movements of the optical apparatus and that controls the movements of the welding torch with a certain delay corresponding to the distance separating the optical apparatus from the welding apparatus and to the advancing speed of the welding apparatus, so that the welding apparatus follows the bevel even if its path is curvilinear.

As the figs. show, the positions of the light emitter (4) and of the receiver (9) can be reversed, the angle (11) corresponding one time to the incident light (FIG. 3 and 4) and the other time to the diffused light (FIG. 1 and 2).

During repetitive oxygen cutting and machining work, the machine tool or the oxygen cutter can be controlled so that the operation in progress is performed on a part whose dimensions are different, larger or smaller than those of the template used for control. The necessary precautions must be taken so that the paths of the tool in relation to the part being worked and those of the optical apparatus in relation to the template are homothetic.

We claim:

1. Optical apparatus (1) for detecting the position of a reference line (2) formed by the edge of a sheet, respectively of a metal sheet of a copying template, or of the edge of a line of sufficient width drawn on a support, the optical apparatus (1) carried by an arm and comprising a light emitter (4), this emitter producing a light ray (5) which travels a first incident axis (6) to fall in the shape of a spot (7) on a point of said reference line where it is diffused and spreads out in various directions, particularly in that of a second axis of diffused light (8) connecting this point to a receiver (9) whose surface consists of a large number of cells (10), each being sensitive to the radiation received and producing an electric signal as a function of said spot brightness, the group of the signals received by the receiver supplying data entering into an electric apparatus acting on the elements that carry the optical apparatus so that the spot of light (7) falling on the reference line (2) whose path can be rectilinear or curvilinear, follows the reference line during the advance of the operation in progress, by keeping the arrangement of the reference line (2) and of the optical apparatus (1) equal to an instruction value which can be suited to the nature of the operation in progress, the movements of the optical apparatus (7) controlling the concomitant movements of a tool so that this tool follows a path homologous to the reference line (2), characterized in that: the position (19) in relation to the receiver (9) of the bright spot (13) diffused on the receiver by the spot (7) falling on the reference line (2), constitutes an adjustment signal used to keep at a desired value the instruction for the distance between the optical apparatus and the reference line, and in that the width (14) of the bright spot (13) falling on the receiver (9) constitutes an adjustment signal used for the control of the transverse movements of the optical apparatus (7) in relation to the reference line (2).

2. Optical apparatus according to claim 1, wherein the light emitter (4) consists of a diode emitting infrared radiation.

3. Optical apparatus according to claim 1, wherein the receiver (9) consists of a network of photodiodes (10) each producing an electric signal as a function of the brightness that it receives.

4. Optical apparatus according to claim 3, wherein the photodiodes (10) are located along a straight line contained in the same plane as that formed by the axes of the incident (6) and diffused (8) rays.

5. Optical apparatus according to claim 1 comprising at least a convergent lens (15) through which the incident ray (6) passes and which forms the image of the light source on the support of the reference line and at least a convergent lens (16) through which the diffused ray (8) passes and which forms the image of the reference line (2) on the receiver (9).

6. Optical apparatus according to claim 1 comprising at least a flat mirror (17) which sends the incident (6) or diffused (8) rays back.

7. Optical apparatus according to claim 5, comprising a means making it possible to incline the receiver by rotating around an axis (18) perpendicular to the plane of the incident (6) and diffused (8) rays, the inclination of the emitter being selected as a function of the enlargement resulting from the presence of a convergent lens through which the diffused ray (8) passes and goes toward the receiver (9) and makes it possible to improve the clarity of the image of the reference line (2) projected on the receiver (9).

8. Optical apparatus according to claim 1, comprising elements which measure the position of the reference line in relation to the arm carrying the optical apparatus and produce control signals which act on the position of at least a tool to control the tool movement and to assure that the tool is held in a good position during the execution of the work in progress.

9. Optical apparatus according to claim 8, wherein the device for controlling the movement of a tool comprises an element for processing data which is adapted to record the movements of the optical apparatus, and stores these movements and is adapted to act on a tool so that the tool follows a path homologous to the reference line, this latter movement being delayed in relation to the movement of the optical apparatus.

10. Optical apparatus according to claim 9, wherein the tool consists of a welding torch and wherein the refrence line (2) followed by the optical apparatus (1) is made by a stop of an edge of a welding bevel of a sheet and wherein in the cutting plane formed by the incident and diffused axes, the sum of the angles $\alpha$ and $\beta$ is less than 180°, $\alpha$ being the smaller of the two angles (11) of the incident and diffused axes in relation to the surface of the sheets, and $\beta$ being the smallest angle (12) between the surface of the sheet and that of the welding bevel.

* * * * *